(12) United States Patent
Lu

(10) Patent No.: US 11,937,351 B2
(45) Date of Patent: Mar. 19, 2024

(54) FILL LIGHT AND POWER SUPPLY CIRCUIT THEREOF

(71) Applicant: GUANGZHOU ZHIYING TECH CO., LTD., Guangzhou (CN)

(72) Inventor: Haiping Lu, Guangzhou (CN)

(73) Assignee: GUANGZHOU ZHIYING TECH CO., LTD., Guangzhou (CN)

( * ) Notice: Subject to any disclaimer, the term of this patent is extended or adjusted under 35 U.S.C. 154(b) by 0 days.

(21) Appl. No.: 18/320,635

(22) Filed: May 19, 2023

(65) Prior Publication Data
US 2023/0389152 A1    Nov. 30, 2023

(30) Foreign Application Priority Data
May 25, 2022   (CN) .......................... 202221286419.4

(51) Int. Cl.
*H05B 45/34*      (2020.01)
*H04N 23/56*     (2023.01)
*H04N 23/74*     (2023.01)
*H05B 45/3725*   (2020.01)

(52) U.S. Cl.
CPC ............ *H05B 45/34* (2020.01); *H04N 23/56* (2023.01); *H05B 45/3725* (2020.01); *H04N 23/74* (2023.01)

(58) Field of Classification Search
CPC .... H05B 45/34; H05B 45/3725; H04N 23/56; H04N 23/74; G03B 15/02; F21V 23/00
See application file for complete search history.

(56) References Cited

U.S. PATENT DOCUMENTS

2023/0100678 A1* 3/2023 Fujisaki ................ H04N 23/74
                                                             348/372

OTHER PUBLICATIONS

Hynetek, "Integrated USB Type-C PD and 1-4 Cell Batteries Charging Reference Design", Hynetek Semiconductor Co., Ltd., RD-2008, Rev. 1.0, 14 pages, Nov. 2020 (Year: 2020).*

* cited by examiner

*Primary Examiner* — Daniel D Chang

(57) ABSTRACT

The present disclosure discloses a fill light and a power supply circuit thereof, said power supply circuit is electrically connected to an external power supply device with PD protocol, and comprises a TYPE-C interface module, a PD induction module, a switching tube Q1 as well as a voltage stabilization module, said voltage stabilization module is a Buck-Boost switching power supply module, the input of said voltage stabilization module is connected with the drain of said switching tube Q1. The technical solution uses the PD induction module to disguise the fill light to be presented as an electric equipment for supporting PD protocol, so that the external power supply device with PD protocol can output high voltage above 12V, while using the Buck-Boost switching power module as the voltage stabilization module of this technical solution to improve the adaptability of the power circuit to the input voltage amplitude.

4 Claims, 1 Drawing Sheet

TYPE-C interface module

FILL LIGHT AND POWER SUPPLY CIRCUIT THEREOF

TECHNICAL FIELD OF THE INVENTION

The present disclosure relates to the field of electronic circuit, and more particularly to a fill light and a power supply circuit thereof.

BACKGROUND OF THE INVENTION

In recent years, short video APP (application) is widely popularized due to rapid development of people's material culture life, and a high-power fill light is used as an important accessory of a shooting scene, so that its market prospects are extremely wide. The existing high-power fill light is generally adapted to a very large power adapter and uses Canon head or DC head for power supply. When carrying or shooting outdoors, it will look very bulky. And in many cases, it needs to be connected to municipal power supply or outdoor power supply to support the high-power fill light. In summary, the mobility of the existing high-power fill light is relatively poor.

In order to solve this problem, a person skilled in the art uses mobile power supply device to supply power to the high-power fill light. Among the common mobile power devices only the power device with PD protocol meets the power supply requirements. The power supply parameters for power device with PD protocols are typically 5V/12W. However, the high-power fill light is not provided with a built-in power supply, and needs to be supplied with power by using high voltage of more than 12V, so that the power supply device with PD protocol outputs the high voltage of more than 12V, which is particularly important. In addition, the existing power supply circuit of the fill light has high requirements on input voltage, and the input voltage needs to be ensured to be stabilized in a narrow range, so that the fill light is applicable to fewer types of mobile power supply devices.

SUMMARY OF THE INVENTION

In order to solve the above-mentioned technical problem, the present disclosure aims to provide a fill light and a power supply circuit thereof.

The technical solution used by the present disclosure for solving the technical problem is as follows:

A power supply circuit for a fill light, wherein said power supply circuit is electrically connected to an external power supply device with PD protocol, comprising:

a TYPE-C interface module for electrically connecting to the external power supply device with PD protocol, said TYPE-C interface module is associated with a communication end as well as a power supply end;

a PD induction module, said PD inducing module is associated with a communication end and a control end, the communication end of said PD induction module is connected with the communication end of said TYPE-C interface module;

a switching tube Q1, the gate of said switching tube Q1 is connected with the control end of said PD induction module, the source of said switching tube Q1 is connected with the power supply end of said TYPE-C interface module;

a voltage stabilization module, said voltage stabilization module is a Buck-Boost switching power supply module, the input of said voltage stabilization module is connected with the drain of said switching tube Q1.

As an improvement to the foregoing technical solution, the PD induction module includes a protocol control chip model HUSB238, said protocol control chip is associated with a communication interface as well as a control interface, the communication interface of said protocol control chip is as the communication end of said PD induction module, the control interface of said protocol control chip is as the control end of said PD induction module.

As an improvement to the foregoing technical solution, said voltage stabilization module includes a power supply chip model BP3208, a resistor R1, a resistor R2, a capacitor C1, a capacitor C2, an inductor L1, a switching tube Q2 and a diode D1, said power supply chip is associated with a driving end as well as a sampling end;

the drain of said switching tube Q1 is connected successively to a negative terminal of said diode D1 through said resistor R1 and said capacitor C1, a positive terminal of said diode D1 is grounded, the drain of said switching tube Q2 is connected to the drain of said switching tube Q1, the gate of said switching tube Q2 is connected at the point where said resistor R1 is connected to said capacitor C1, the source of said switching tube Q2 is connected to the driving end of said power supply chip, the negative terminal of said diode D1 is connected to the sampling end of said power supply chip through said resistor R2, the negative terminal of said diode D1 is connected to one end of said inductor L1, the other end of said inductor L1 is grounded through said capacitor C2, and said other end of said inductor L1 serves as an output of said voltage stabilization module.

As an improvement to the foregoing technical solution, the technical solution further comprises an illumination detection module and an analog-to-digital conversion module, said illumination detection module is used for detecting illumination intensity and outputting voltage signals of different amplitudes according to illumination intensity, said resistor R2 is a digital potentiometer, said illumination detection module is connected to the input of said analog-to-digital conversion module, and the output of said analog-to-digital conversion module is connected to said resistor R2.

At the same time, the present disclosure further discloses a fill light, comprising a light source module and the aforesaid power supply circuit, wherein the output of said voltage stabilization module is connected to said light source module.

The present disclosure has the following advantageous effects: the technical solution uses the PD induction module to disguise the fill light to be presented as an electric equipment for supporting PD protocol, so that the external power supply device with PD protocol can output high voltage above 12V, while using the Buck-Boost switching power module as the voltage stabilization module of this technical solution to improve the adaptability of the power circuit to the input voltage amplitude.

BRIEF DESCRIPTION OF THE DRAWINGS

The present disclosure will be further explained with reference to the description of the drawings and the specific embodiments.

REFERENCE SIGNS IN THE DRAWINGS

11, CC1, CC2, D+, D−, communication end of the USB TYPE-C interface module;
17, VBUS, power supply end of the USB TYPE-C interface module;
12, communication end of the PD induction module;
13, control end of the PD induction module;
CC1, CC2, D+, D−, communication interface of the protocol control chip;
Gate, control interface of the protocol control chip;
16, input of the voltage stabilization module;
OUT, NC, CS driving end of the power supply chip;
FB, RTH, sampling end of the power supply chip;
14, input of the analog-to-digital conversion module; and
15, output of the analog-to-digital conversion module.

DETAILED DESCRIPTION OF THE PREFERRED EMBODIMENT

In this section, the specific embodiments of the present disclosure will be described in detail. The preferred embodiments of the present disclosure will be shown in the accompanying drawings, which function to supplement the description of a literal portion of the specification using the drawings, so that each technical feature and the overall technical solution of the present disclosure can be perceptibly and visually understood, but cannot be understood as a limitation on the protection scope of the present disclosure.

In the description of the present disclosure, it is necessary to understand that, when there involves the description of orientation, the orientation or position relationship for example indicated by upper, lower, front, rear, left and right which is based on the orientation or position relationship shown in the accompanying drawings, is only to facilitate description of the present disclosure and simplify the description, rather than to indicate or imply that the device or element referred thereto must have a specific orientation and is configured and operated in a specific orientation, and therefore cannot be understood as a limitation on the present disclosure.

In the description of the present disclosure, the meaning of the expression "a plurality of" is one or more, and the meaning of the expression "more" is more than two. The expressions such as "more than", "less than", and "exceeding" do not include this number, and the expression "or more", "or less" and "within" include this number. The expressions of "first" and "second", if any, are only intended to distinguish the technical features, but cannot be understood as indicating or implying relative importance or implicitly indicating the number of the technical features as indicated or the sequence of the technical features as indicated.

In the description of the present disclosure, unless clearly defined otherwise, the words such as "provided", "mounted" and "connected" should be understood in a broad sense, and those skilled in the art may reasonably determine the specific meanings of the above-described words in the present disclosure in conjunction with the specific content of the technical solution.

Figure 1:
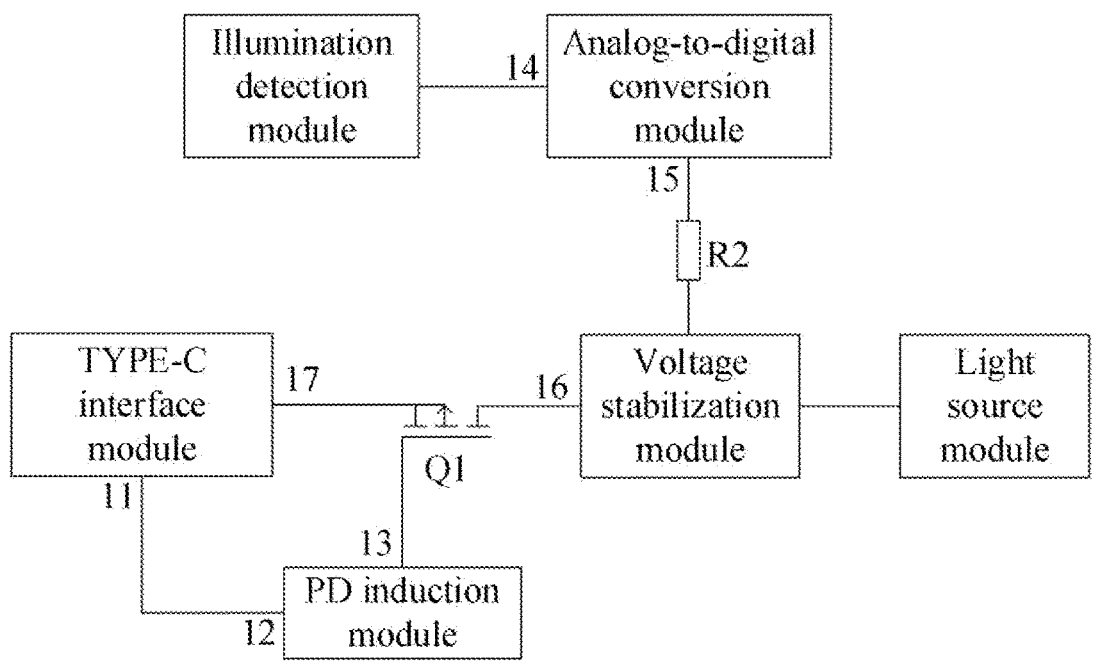
FIG. 1 is a frame diagram of the module of the present disclosure.
Figure 2:
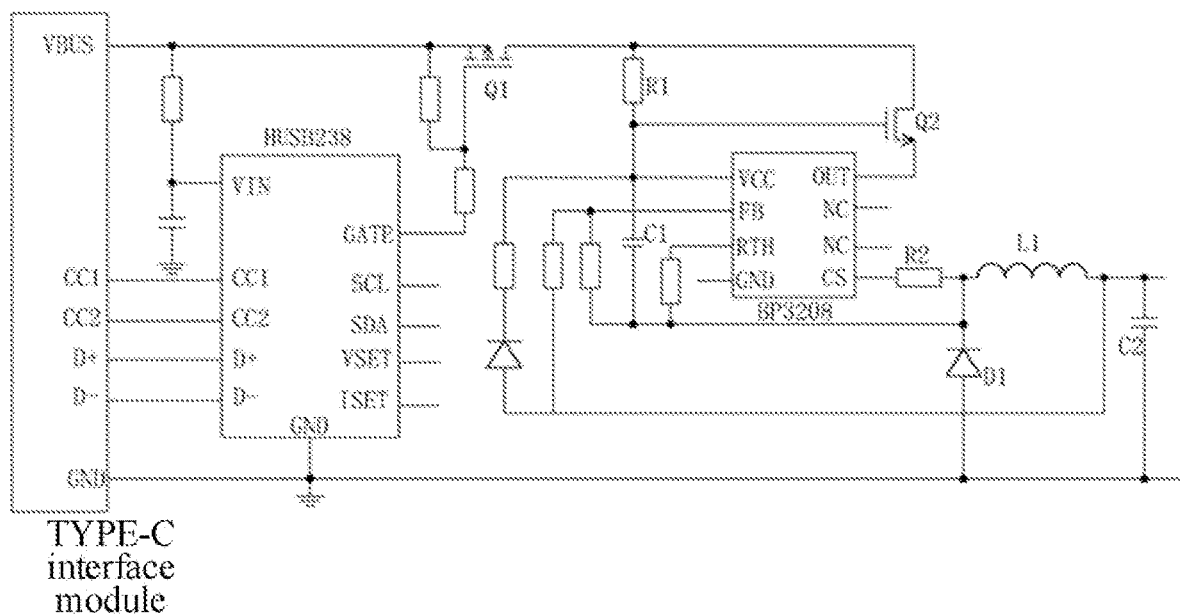
FIG. 2 is a schematic view of the circuit of the present disclosure.

Referring to FIGS. 1 and 2, the present application discloses a power supply circuit for a fill light, wherein said power supply circuit is electrically connected to an external power supply device with PD protocol, in the first embodiment, it comprises:

a TYPE-C interface module for electrically connecting to the external power supply device with PD protocol, said TYPE-C interface module is associated with a communication end as well as a power supply end;

a PD induction module, said PD inducing module is associated with a communication end and a control end, the communication end of said PD induction module is connected with the communication end of said TYPE-C interface module;

a switching tube Q1, the gate of said switching tube Q1 is connected with the control end of said PD induction module, the source of said switching tube Q1 is connected with the power supply end of said TYPE-C interface module;

a voltage stabilization module, said voltage stabilization module is a Buck-Boost switching power supply module, the input of said voltage stabilization module is connected with the drain of said switching tube Q1.

Specifically, in the present embodiment, the PD induction module is used to disguise the fill light to be presented as an electric equipment for supporting PD protocol, so that the external power supply device with PD protocol can output high voltage above 12V, while using the Buck-Boost switching power module as the voltage stabilization module of the present embodiment to improve the adaptability of the power circuit to the input voltage amplitude, making the power supply circuit of this embodiment applicable to a wider range of input voltages.

Further, as a preferred embodiment, the PD induction module includes a protocol control chip model HUSB238, said protocol control chip is associated with a communication interface as well as a control interface, the communication interface of said protocol control chip is as the communication end of said PD induction module, the control interface of said protocol control chip is as the control end of said PD induction module.

Further, as a preferred embodiment, said voltage stabilization module includes a power supply chip model BP3208, a resistor R1, a resistor R2, a capacitor C1, a capacitor C2, an inductor L1, a switching tube Q2 and a diode D1, said power supply chip is associated with a driving end as well as a sampling end;

the drain of said switching tube Q1 is connected successively to a negative terminal of said diode D1 through said resistor R1 and said capacitor C1, a positive terminal of said diode D1 is grounded, the drain of said switching tube Q2 is connected to the drain of said switching tube Q1, the gate of said switching tube Q2 is connected at the point where said resistor R1 is connected to said capacitor C1, the source of said switching tube Q2 is connected to the driving end of said power supply chip, the negative terminal of said diode D1 is connected to the sampling end of said power supply chip through said resistor R2, the negative terminal of said diode D1 is connected to one end of said inductor L1, the other end of said inductor L1 is grounded through said capacitor C2, and said other end of said inductor L1 serves as an output of said voltage stabilization module.

In the present embodiment, the said power supply chip model BP3208 is used as the core of the said voltage stabilization module, which greatly reduces the complexity of the circuit. At the same time, the power supply chip is associated with functions such as open-circuit protection, short-circuit protection, overheating protection and the like, so that the safety of the power supply circuit of the fill light is greatly improved.

Further, as a preferred embodiment, the present embodiment further comprises an illumination detection module and an analog-to-digital conversion module, said illumination detection module is used for detecting illumination intensity and outputting voltage signals of different amplitudes according to illumination intensity, said resistor R2 is a digital potentiometer, said illumination detection module is connected to the input of said analog-to-digital conversion module, and the output of said analog-to-digital conversion module is connected to said resistor R2. In the present embodiment, the fill light is configured to be able to adjust the magnitude of the output current of the power supply circuit in the present embodiment according to the different external illumination intensity. In the present embodiment, said resistor R2 is used as a sampling resistance of said power supply chip. When the resistance value of said resistor R2 is changed, the magnitude of the output current of said voltage stabilization module is also changed. The present embodiment uses a digital potentiometer as the adopted resistance, together with said illumination detection module and said analog-to-digital conversion module to achieve said resistance R2 resistance value change, so as to change the output power of the fill light.

At the same time, the present application further discloses a fill light, the first embodiment comprises a light source module and the aforesaid power supply circuit, wherein the output of said voltage stabilization module is connected to said light source module.

The above are preferred embodiments of the present disclosure merely and are not intended to limit the patent scope of the present disclosure. Any equivalent structures made according to the description and the accompanying drawings of the present disclosure without departing from the idea of the present disclosure, or any equivalent structures applied in other relevant technical fields directly or indirectly are intended to be included in the patent protection scope of the present disclosure.

The invention claimed is:

1. A power supply circuit for a fill light, characterized in that said power supply circuit is electrically connected to an external power supply device with a Universal Serial Bus Power Delivery (USB PD) protocol, comprising:
   a Universal Serial Bus TYPE-C(USB TYPE-C) interface module for electrically connecting to the external power supply device with the USB PD protocol, wherein said USB TYPE-C interface module includes a communication end and a power supply end;
   a Power Delivery (PD) induction module, wherein said PD induction module includes a communication end and a control end, and the communication end of said PD induction module is connected with the communication end of said USB TYPE-C interface module;
   a first switching tube (Q1), wherein the gate of said first switching tube (Q1) is connected with the control end of said PD induction module, and the source of said first switching tube (Q1) is connected with the power supply end of said USB TYPE-C interface module; and
   a voltage stabilization module, wherein said voltage stabilization module is a Buck-Boost switching power supply module, and the input of said voltage stabilization module is connected with the drain of said first switching tube (Q1),
   wherein said voltage stabilization module includes a power supply chip (model BP3208), a first resistor (R1), a second resistor (R2), a first capacitor (C1), a second capacitor (C2), an inductor (L1), a second switching tube (Q2) and a diode (D1), said power supply chip is includes a driving end and a sampling end,
   the drain of said first switching tube (Q1) is connected successively to a negative terminal of said diode (D1) through said first resistor (R1) and said first capacitor (C1), a positive terminal of said diode (D1) is grounded, the drain of said second switching tube (Q2) is connected to the drain of said first switching tube (Q1), the gate of said second switching tube(Q2) is connected at the point where said first resistor (R1) is connected to said first capacitor (C1), the source of said second switching tube (Q2) is connected to the driving end of said power supply chip, the negative terminal of said diode (D1) is connected to the sampling end of said power supply chip through said second resistor (R2), the negative terminal of said diode (D1) is connected to one end of said inductor (L1), and the other end of said inductor (L1) is grounded through said second capacitor (C2) and serves as an output of said voltage stabilization module.

2. The power supply circuit according to claim 1, wherein the PD induction module includes a protocol control chip (model HUSB238), said protocol control chip includes a communication interface and a control interface, the communication interface of said protocol control chip is the communication end of said PD induction module, and the control interface of said protocol control chip is the control end of said PD induction module.

3. The power supply circuit according to claim 1, further comprising: an illumination detection module and an analog-to-digital conversion module, wherein said illumination detection module is used for detecting illumination intensity and outputting voltage signals of different amplitudes according to the detected illumination intensity, said second resistor (R2) is a digital potentiometer, said illumination detection module is connected to the input of said analog-to-digital conversion module, and the output of said analog-to-digital conversion module is connected to said second resistor (R2).

4. A fill light comprising a light source module and the power supply circuit according to claim 1, wherein the output of said voltage stabilization module is connected to the light source module.

* * * * *